United States Patent Office 3,123,594
Patented Mar. 3, 1964

3,123,594
AZOPHTHALOCYANINE DYESTUFFS CONTAINING A TRIAZINE RADICAL
Eugen Johann Koller and Raymond Gunst, Binningen, Switzerland, assignors to Ciba Corporation, a corporation of Delaware
No Drawing. Filed July 14, 1960, Ser. No. 42,762
Claims priority, application Switzerland July 16, 1959
5 Claims. (Cl. 260—146)

This invention provides new, valuable dyestuffs of the formula (1)
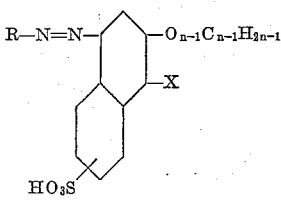

in which R indicates the radical of an azo group-free diazo component, preferably the radical of a benzene or naphthalene sulfonic acid, $n$ is a positive whole number which is at most 2 and X is the radical of a halogenated 1,3,5-triazine attached by way of an amino bridge, especially an —NH-bridge, of the formula

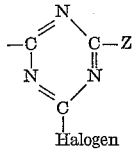

in which Z is the radical of a phthalocyanine sulfonamide containing sulfonic acid groups and attached by means of an NH-group. The invention is concerned more especially with such monoazodyestuffs as contain a 2-chloro-4-amino-1,3,5-triazine radical of the formula

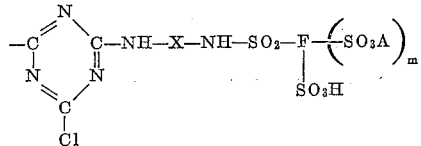

in which X indicates an alkylene or arylene radical, A is a hydroxyl or amino group, $m$ a whole number which is at most 2 and F a copper phthalocyanine radical.

For the manufacture of the dyestuffs of the invention, a trihalogen-1,3,5-triazine, more especially the 2,4,6-trichloro-1,3,5-triazine, may be condensed on the one hand with an amino-monoazo deystuff of the formula (2)
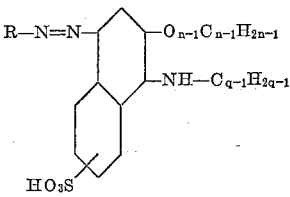

in which R and $n$ have the same significance as in Formula 1, and $q$ is a positive whole number which is at most 3, and on the other hand with a phthalocyanine sulfonamide containing sulfonic acid groups, which contains an acylatable amino group, the condensation being conducted in such a manner that a monohalogen-triazine condensation product is produced.

For the production of the starting materials of the Formula 2 there are concerned as coupling components, for example, 2-methoxy-1-aminonaphthalene-6-sulfonic acid but primarily 1-aminonaphthalene-6- or 7-sulfonic acid.

The diazo components to be coupled with these coupling components may contain water-solubilizing and non-water-solubilizing substituents, for example strongly acid water-solubilizing substituents such as sulfonic acid groups. These diazo components may be either relatively simple compounds, for example amino-benzene and their sulfonic acids, amino-naphthalene sulfonic acid, amino-pyrene or -chrysene sulfonic acids or aminonaphthol sulfonic acids, or complicated diazotized compounds, which however should contain no azo groups.

As examples of amines of which the diazo compound is applicable for coupling with the specified coupling components containing acylatable amino groups, the following may, for example, be mentioned:

1-aminobenzene-2-, -3- or -4-sulfonic acid,
1-aminobenzene-2-, -3- or -4-carboxylic acid,
2-amino-1-methoxybenzene-4-sulfonic acid,
1-amino-4-methoxybenzene-2-sulfonic acid,
3-amino-2-hydroxybenzoic acid-5-sulfonic acid,
3-amino-6-hydroxybenzoic-5-sulfonic acid,
2-methoxy- or 2-methyl-1-aminobenzene-4-sulfonic acid,
5-acylamino-2-aminobenzene-1-sulfonic acid,
4-acetylamino-2-aminobenzene-1-sulfonic acid,
4-acetylamino-2-methyl-5-methoxy-1-aminobenzene,
5-acetylamino- or 5-benzoylamino-2-aminobenzene-1-carboxylic acid,
5-amino-2-nitrobenzoic acid,
2.4-dimethyl-1-aminobenzene-6-sulfonic acid,
2-methyl-4-chloro-1-aminobenzene-6-sulfonic acid,
2-aminobenzoic acid-4- or -5-sulfonic acid,
1-aminonaphthalene-4-, -5-, -6- or -7-sulfonic acid,
2-aminonaphthalene-4-, -6-, -7- or -8-sulfonic acid,
1-aminonaphthalene-3,6-disulfonic acid,
1-aminobenzene-2,5-disulfonic acid,
2-aminonaphthalene-4,8-, 5,7- or 6,8-disulfonic acid,
1-(3'- or 4'-aminobenzoyl)-aminobenzene-3-sulfonic acid,
3-aminopyrene-8- or -10-monosulfonic acid,
3-aminopyrene-5,8- or 5,10-disulfonic acid,
4-nitro-4'-aminostilbene-2,2'-disulfonic acid and
O-acylderivatives of aminonaphthol sulfonic acid, e.g., the O-acylderivatives of 1-amino-8-hydroxynaphthalene-3,6- or 4,6-disulfonic acid or dehydrothiotoluidine-mono- or disulfonic acid.

The coupling of the diazo compounds, obtained, for example, by means of mineral acid, especially hydrochloric acid, and sodium nitrite, with the specified aminonaphthalene sulfonic acids, takes place by methods known per se.

The condensation of the resulting aminomonoazo dyestuffs with cyanuric chloride is to be carried out in such a manner that in the resulting condensation product two replaceable halogen atoms still remain, of which one is replaced by the present process by the radical of an aminophthalocyanine sulfonamide containing sulfonic acid groups. Such phthalocyanines are used as contain an acylatable amino group in an external nucleus, i.e., in a nucleus which is attached to the phthalocyanine nucleus by means of a sulfonic acid amide or sulfonic acid aryl ester group.

Instead of being attached in an external nucleus, the acylatable group can be attached by an alkylene chain which is connected to the phthalocyanine molecule by means of an —SO₂NH-group. Both metal-free and metalliferous phthalocyanine dyestuffs of this type are concerned. With advantage there may be used the complex heavy metal compounds of the phthalocyanines containing sulfonic acid groups, for example the iron compounds but more especially the phthalocyanines containing sulfonic acid groups which contain cobalt, nickel, copper or zinc, i.e., one of the heavy metals of atomic numbers 27 to 30, in complex combination. Especially good results are provided in this case by the copper phthalocyanines which contain sulfonic acid groups or are sulfonated. According to the selected method of production, the sulfonic acid groups in the phthalocyanine molecule are in 4- or 3-position, which depends on whether there is used as starting material for their production the 4-sulfo-phthalic acid or whether they are produced by sulfonation or by direct sulfochlorination of the phthalocyanine.

Such phthalocyanine dyestuffs as serve as starting materials in the present process may be produced, for example, by condensation of phthalocyanine sulfonic acid halides (obtainable, for example, by treatment of metal-free or metalliferous phthalocyanines with chlorsulfonic acid or from the phthalocyanine di-to-tetra-sulfonic acids, by reaction with acid halogenating agents such as phosphorus halides, thionyl chloride or chlorsulfonic acid) with organic compounds containing an acylatable hydroxyl or amino group, which contain together with this acylatable group a further acylatable amino group or a substituent convertible thereinto after the reaction with the phthalocyanine sulfonic acid halide. As such organic compounds are therefore concerned bifunctional organic compounds, such as hydroxyamine or diamines, for example cyclic, more especially aromatic, diamines, such as 4,4' - diaminodiphenyl - 4,4' - diaminostilbene - 2,2' - disulfonic acid, 1,4- or 1,3-diaminobenzene and primarily 1,4-diamino-benzene-2-sulfonic acid and 1,3-diaminobenzene-4-sulfonic acid. Nitranilines or monoacyl derivatives of organic diamines may also be used and, after the reaction with the phthalocyanine sulfonic acid chloride employed, a new NH₂-group liberated by reduction or hydrolysis. In the selection of the starting materials, care must be taken that in the product produced, together with at least one acylatable amino group, preferably at least two sulfonic acid groups are present. For this reason there are used as starting materials, for example, phthalocyanine dyestuffs containing at least two sulfonic acid halide groups, and these are treated with hydroxyamines or diamines containing sulfonic acid groups. If hydroxyamines or diamines containing no sulfonic acid groups are used, these must be reacted with at most one sulfonic acid halide group of a phthalocyanine sulfonic acid halide containing at least three such groups. Thus, for example, there are obtained from one mol of a phthalocyanine tetra-sulfonic acid chloride and one to at most two mol of one of the mentioned hydroxyamines or diamines containing no sulfonic acid groups or with their monoacyl derivatives, very valuable phthalocyanine dyestuffs serving as starting materials for the present process, which after hydrolysis or partial amidation and hydrolysis of the non-reacted sulfonic acid chloride groups, contain SO₃H-groups and at least one acylatable amino group, whereas with the use of hydroxyamines containing sulfonic acid groups, such as 1-amino-3-hydroxybenzene-6-sulfonic acid, or diamines containing sulfonic acid groups, such as 1,3-diaminobenzene-4-sulfonic acid, 1,4-diaminobenzene-2-sulfonic acid, diamino-monoazo dyestuffs containing sulfonic acid groups, or their monoacyl derivatives, if desired more than two of the sulfonic acid chloride groups present in the starting phthalocyanine may react.

Such phthalocyanine dyestuffs containing acylatable amino groups are, according to the invention, so condensed on the amino group with the dichlorotriazine monoazo dyestuffs obtainable from cyanuric chloride and the initially mentioned amino-monoazo dyestuffs, that halogen-containing triazine condensation products are produced which contain one monoazo dyestuff radical of the specified type and one phthalocyanine dyestuff radical attached to the triazine nucleus.

The condensation according to the invention of these amino compounds with dihalogen-triazine dyestuffs, is carried out advantageously with the use of acid-binding agents, such as sodium carbonate or sodium hydroxide, and under such conditions that in the product produced one replaceable halogen atom still remains, i.e., for example in organic solvents or at relatively low temperatures in an aqueous medium.

The azophthalocyanine dyestuffs containing triazine, of the present invention, can accordingly be produced either by condensation of the phthalocyanine dyestuff with trihalogen-triazines and condensation of the amino-monoazo dyestuff with the resulting phthalocyanine dichlorotriazine condensate or, conversely, by condensing the aminomonoazo dyestuff first with trihalogen-triazines and reacting the phthalocyanine dyestuff in the last stage. This latter method of production in general gives the most valuable products.

The dyestuffs of this invention may be isolated and worked up to useful, dry dye preparations. Isolation in this case takes place preferably at low temperatures by salting out and filtration or by spray drying. The filtered dyestuffs can be dried, if desired after the addition of color stretching agents and buffer substances, such as mixtures of equal parts of mono- and di-sodium phosphate. Preferably the drying is carried out at not too high temperatures and under reduced pressure.

The new dyestuffs of this invention are suitable for the dyeing and printing of a wide variety of materials such as wool, silk, leather and superpolyamides, but more especially cellulosic materials of fibrous structure, such as linen, regenerated cellulose and more especially cotton. They are suitable for dyeing by the so called pad dyeing process, but quite particularly, however, for dyeing by the print dyeing process, according to which the dyestuffs applied to the goods to be dyed are fixed in the hot and in the presence of acid-binding agents. This process and the direct dyeing method, which is also applicable in the case of many of the dyestuffs obtained by the present process, give valuable dyeings and prints which are fixed fast to washing.

The dyeings and printings obtainable with the new dyestuff preparations on cellulosic fibers are distinguished as a rule by purity, good fastness to light and primarily by outstanding fastness to wet processing, especially a very good fastness to washing.

The following examples illustrate the invention, the parts and percentages being by weight unless otherwise stated and the relation between part by weight and part by volume being the same as that between the gram and cubic centimeter.

EXAMPLE 1

A quantity corresponding to 9.66 parts of sodium nitrite, of a mixture consisting of the mono and the diamides of copper phthalocyanine-3,3',3'',3'''-tetrasulfonic acid, which correspond to the formulae

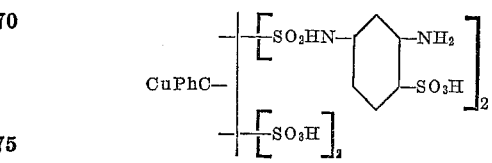

and

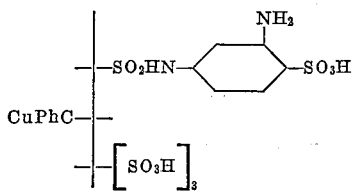

which mixture is obtainable from copper phthalocyanine-3,3′,3″,3‴-tetrasulfochloride by condensation with 1,3-diaminobenzene-4-sulfonic acid and hydrolysis of the unreacted sulfochloride groups, is dissolved in 750 parts of water and brought to a pH value of 7.0. To this dyestuff solution are added 1500 parts of a neutral, aqueous solution containing 96 parts of the dyestuff of the formula

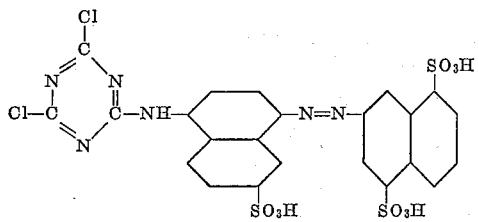

The well stirred reaction mixture is treated with 14 parts of sodium bicarbonate and the whole heated for 20 hours to 30° C. For isolation of the dyestuff, the reaction mixture is evaporated to dryness under vacuum at 60–70° C. The resulting product gives on cotton green shades fixed fast to washing.

By using the copper phthalocyanine-3-[β-aminoethyl]-sulfonamide disulfonic acid of the formula

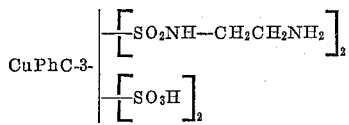

and condensing with the corresponding quantity of the above described dichlorotriazine dyestuff, a dyestuff of similar shade is obtained.

The dichlorotriazine dyestuff employed can be prepared, for example, as follows:

30.7 parts of 2-aminonaphthalene-4,8-disulfonic acid are stirred with 50 parts of ice and an aqueous solution of 6.9 parts of sodium nitrite and 25 parts by volume of hydrochloric acid is added. As soon as the diazotization is complete, the reaction medium is treated with a solution, brought to pH 7, of 22.3 parts of 1-aminonaphthalene-6-sulfonic acid in 400 parts of water. When the coupling is complete, the reaction mixture is brought to pH 7 and at 0° C. 18.6 parts of cyanuric chloride in a fine state of division are added to the reaction mixture. The condensation advantageously takes place at a pH value of 8–6 and a temperature of 5–10° C.

EXAMPLE 2

98.5 parts of the copper phthalocyanine dyestuff of formula

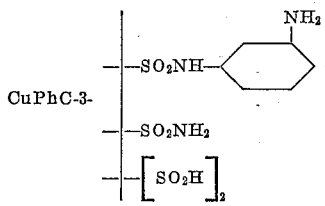

obtainable from copper phthalocyanine-3,3′,3″,3‴-tetrasulfonic acid chloride by condensation with monoacetyl-m-phenylenediamine in the presence of ammonia with subsequent hydrolysis of the acetyl group, are dissolved in 1000 parts of water at a pH value of 7–7.5. To the resulting dyestuff solution are added at 10–15° C. 1000 parts by volume of an aqueous neutral solution containing 68.5 parts of the dyestuff of the formula

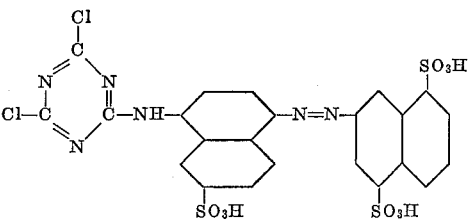

The temperature of the well stirred reaction mixture is brought slowly to 30–40° C. The hydrochloric acid liberated in the condensation is neutralized by the dropwise addition of sufficient 2 N-sodium hydroxide solution so that the pH value is always maintained between 6.5 and 7.5. As soon as the condensation is complete, the dyestuff is precipitated with potassium chloride, isolated by filtration and dried under vacuum. It dyes cellulosic fiber in fast green shades.

EXAMPLE 3

94 parts of copper phthalocyanine-3-sulfonic acid-N-[β-aminoethyl]-amide-3′,3″,3‴-trisulfonic acid of the formula

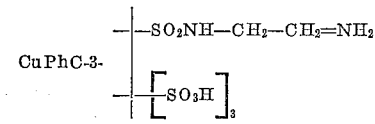

which is obtained from copper phthalocyanine-3,3′3″,3‴-tetrasulfonic acid chloride by condensation with monoacetylethylenediamine and subsequent hydrolysis of the acetyl group, are dissolved in 1000 parts of water at a pH value of 7–7.5. To the resulting dyestuff solution are added at 10° C. 1200 parts of an aqueous, neutral solution containing 68.5 parts of the dyestuff of the formula

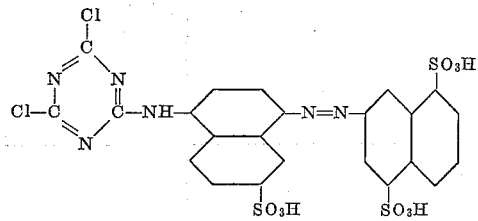

The temperature of the well stirred reaction mixture is brought slowly to 30–40° C., while at the same time the pH value is maintained at 7–7.8 by slow addition of dilute sodium hydroxide solution.

For isolation of the dyestuff, the solution is evaporated under vacuum to dryness. The resulting product gives on cotton by the print dyeing method green shades fixed fast to washing.

EXAMPLES 4–21

By the methods indicated in the previous examples, similar dyestuffs can be obtained by condensation of cyanuric chloride on the one hand with one of the monoazodyestuffs set out in the following Table under I (obtained by coupling of a diazonium compound of the amines mentioned in column A with the corresponding coupling components of column B) and by condensation of the resulting dichlorotriazine condensation product with the copper phthalocyanine dyestuffs set out in column II on the other hand.

The resulting monochlorotriazine products give on cotton green dyeings fixed fast to washing.

| | I Monoazodyestuffs | | II |
|---|---|---|---|
| | A | B | |
| 4 | 2-Aminonaphthalene-4,8-disulfonic acid. | 1-Aminonaphthalene-6-sulfonic acid. | CuPhC-3,4',4'',4'''—[—SO$_2$NH—C$_6$H$_4$—NH$_2$] / [—(SO$_3$H)$_3$] |
| 5 | ----do---- | 1-Amino-2-methoxynaphthalene-6-sulfonic acid. | CuPhC-3—[—SO$_2$NH—C$_6$H$_4$—NH$_2$] / [—(SO$_3$H)$_3$] |
| 6 | ----do---- | ----do---- | CuPhC-3—[—SO$_2$NH—C$_6$H$_4$—NH$_2$ / —SO$_2$NH$_2$ / —(SO$_3$H)$_2$] |
| 7 | 1-Aminonaphthalene-2,5,7-trisulfonic acid. | 1-Amino-2-methoxynaphthalene-7-sulfonic acid. | CuPhC-3—[—SO$_2$NH—C$_6$H$_4$—NH$_2$ / —SO$_2$NH$_2$ / —(SO$_3$H)$_2$] |
| 8 | 2-Aminonaphthalene-4,8-disulfonic acid. | 1-Aminonaphthalene-7-sulfonic acid. | CuFnC-3—[—SO$_2$NH—C$_6$H$_4$(NH$_2$)(SO$_3$H)] / [—(SO$_3$H)$_3$] |
| 9 | ----do---- | ----do---- | CuPhC-3—[—SO$_2$NH—C$_6$H$_4$—NH$_2$] / [—(SO$_3$H)$_3$] |
| 10 | ----do---- | ----do---- | CuPhC-3—[—SO$_2$NH—CH$_2$—CH$_2$—NH$_2$] / [—(SO$_3$H)$_3$] |
| 11 | 1-Aminonaphthalene-2,5,7-trisulfonic acid. | 1-Aminonaphthalene-6-sulfonic acid. | CuPhC-3—[—SO$_2$NH—C$_6$H$_4$—NH$_2$] / [—(SO$_3$H)$_3$] |
| 12 | ----do---- | ----do---- | CuPhC-3—[—SO$_2$NH—CH$_2$—CH$_2$—NH$_2$] / [—(SO$_3$H)$_3$] |
| 13 | ----do---- | 1-Aminonaphthalene-7-sulfonic acid. | CuPhC-3—[—SO$_2$NH—C$_6$H$_4$—NH$_2$] / [—(SO$_3$H)$_3$] |
| 14 | ----do---- | ----do---- | CuPhC-3—[—SO$_2$NH—CH$_2$—CH$_2$—NH$_2$] / [—(SO$_3$H)$_3$] |
| 15 | 2-Aminonaphthalene-4,8-disulfonic acid. | 1-Aminonaphthalene-6-sulfonic acid. | CuPhC-4,4',4'',4'''—[—SO$_2$NH—C$_6$H$_4$—NH$_2$] / [—(SO$_3$H)$_3$] |
| 16 | 2-Aminonaphthalene-6,8-disulfonic acid. | ----do---- | CuPhC-3—[—SO$_2$NH—C$_6$H$_4$—NH$_2$ / —SO$_2$NH$_2$ / —(SO$_3$H)$_2$] |

| | I Monoazodyestuffs | | II |
|---|---|---|---|
| | A | B | |
| 17 | 1-Aminobenzene-2,5-disulfonic acid. | do | CuPhC-3- —\|—SO₂NH—⟨  ⟩—NH₂  —\|—(SO₃H)₃ |
| 18 | do | 1-Aminonaphthalene-7-sulfonic acid. | CuPhC-3- —\|—SO₂NH—⟨  ⟩—NH₂  —\|—(SO₃H)₃ |
| 19 | 2-Aminonaphthalene-4,8-disulfonic acid. | 1-Aminonaphthalene-8-sulfonic acid. | —\|—SO₂NH—⟨  ⟩—NH₂  CuPhC-3- —\|—(SO₂NH₂)  —\|—(SO₃H)₂ |
| 20 | 1-Aminobenzene-3-sulfonic acid. | 1-Aminonaphthalene-6-sulfonic acid. | —\|—SO₂NH—⟨  ⟩—NH₂  CuPhC-3- —\|—(SO₂NH₂)  —\|—(SO₃H)₂ |
| 21 | do | 1-Aminonaphthalene-7-sulfonic acid. | —\|—SO₂NH—⟨  ⟩—NH₂  CuPhC-3- —\|—(SO₂NH₂)  —\|—(SO₃H)₂ |

EXAMPLE 22

106.6 parts of copper phthalocyanine-3-sulfonic acid-N-[m-amino-n-sulfophenyl]-amide - 3',3'',3''' - trisulfonic acid are dissolved in 500 parts of water with the addition of dilute sodium hydroxide solution and the resulting solution is brought to a pH value of 7–7.5. The whole is cooled to 0–5° C. and treated with a solution in acetone of cyanuric chloride which is obtained by dissolving 18.6 parts of cyanuric chloride in 100 parts by volume of acetone. By cooling, the temperature is maintained at 5–10° C. and by addition of dilute sodium hydroxide solution the pH value of the reaction mixture is permanently maintained between 6 and 7.5. When the condensation is complete, 500 parts of an aqueous, neutral solution are added which contains 40.7 parts of the dyestuff of the formula.

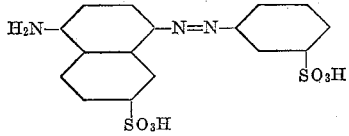

The well stirred reaction mixture is treated with 8.5 parts of sodium bicarbonate and heated for 20 hours to 30–34° C. For isolation of the resulting dyestuff, the reaction mixture is evaporated to dryness under vacuum at 60° C.

Dye Method A 2 parts of dyestuff are dissolved in 100 parts of water. A cotton fabric is impregnated on the foulard with this solution and the excess liquid is squeezed off to such an extent that the material retains 75% of its weight of dyestuff solution. The goods thus impregnated are dried and then impregnated at room temperature in a solution containing per liter 10 grams of sodium hydroxide and 300 grams of sodium chloride, the material squeezed out to a liquid absorption of 75% and then steamed for 60 hours at 100–101° C. The material is then rinsed, soaped for a quarter of an hour in a 0.3% solution of a non-ionic washing agent at boiling temperature, rinsed and dried.

Dye Method B 3 parts of dyestuff and 2 parts of sodium carbonate are dissolved in 75 parts of water with 25 parts of urea. A cotton fabric is impregnated with this solution, squeezed out to an increase in weight of 75% and dried.

The material is then subjected to dry heat at 140° C. for 5 minutes, rinsed and soaped at boiling temperature. A green dyeing, fixed fast to washing is obtained.

Printing Method 30 parts of dyestuff are dissolved in 339 parts of water with 200 parts of urea and the solution poured into 400 parts of an about 5% sodium alginate thickening and treated with 30 parts of potassium carbonate and 1 part of sodium hydroxide of 36° Bé. A cotton fabric is printed in the customary manner with the resulting printing color and dried. The material is then steamed for 8 minutes at 100–101° C., rinsed, soaped, rinsed again and dried.

Exhaust Process 5 parts of a monochlorotriazine dyestuff obtained according to Example 9 are dissolved in 400 parts of water with 80 parts of trisodium phosphate and the whole made up with water to 4000 parts. After the addition of 80 parts of sodium chloride, 100 parts of a cotton fabric are entered into this dye bath, the temperature raised within ½ hour to 60° C., a further 80 parts of sodium chloride added, the temperature raised within a quarter of an hour to 80° C. and the whole maintained for ½ hour at this temperature. The resulting green dyeing is then rinsed and soaped for 15 minutes in a boiling 0.3% solution of a non-ionic washing agent.

What is claimed is:

1. A water-soluble dyestuff of the formula

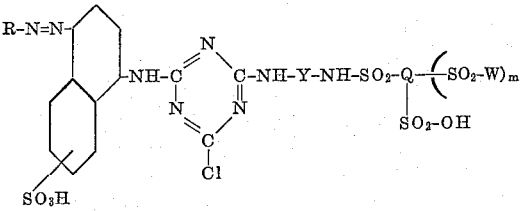

wherein R is a radical selected from the group consisting of the radicals of benzene monosulfonic acid, benzene disulfonic acid, naphthalene monosulfonic acid, naphthalene disulfonic acid and naphthalene trisulfonic acid, m is a whole number up to 2, Y is a member selected from the group consisting of lower alkylene, the phenylene and the sulfophenylene radicals, W is a member of the group consisting of the hydroxy and amino groups, and Q is the copper phthalocyanine radical bearing the —SO₂-groupings each in one of the 3, 3', 3'', 3''', 4, 4', 4'', and 4''' positions.

2. The dyestuff of the formula

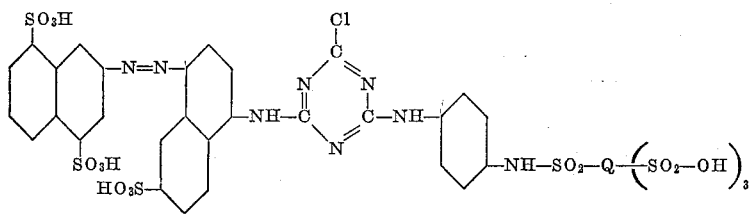

wherein Q is the copper phthalocyanine radical bearing the SO₂-groups in the 3, 3', 3'' and 3''' positions.

3. The dyestuff of the formula

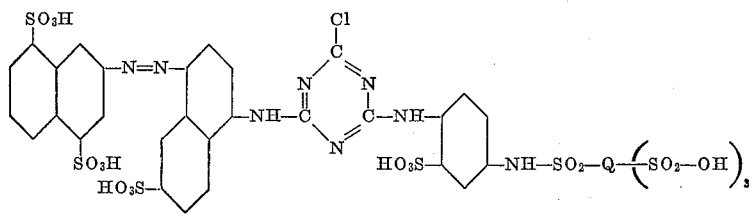

wherein Q is the copper phthalocyanine radical bearing the SO₂-groups in the 3, 3', 3'' and 3''' positions.

4. The dyestuff of the formula

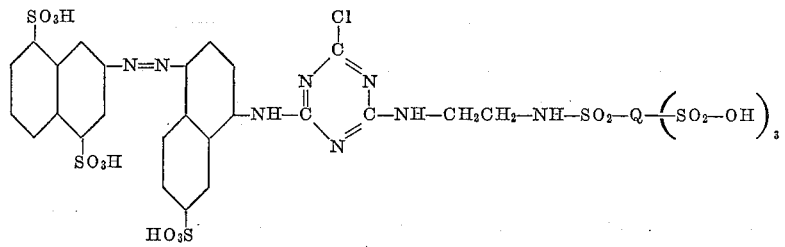

wherein Q is the copper phthalocyanine radical bearing the SO₂-groups in the 3, 3', 3'' and 3''' positions.

5. The dyestuff of the formula

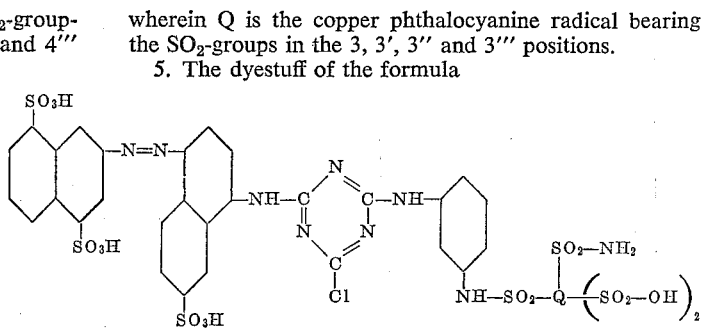

wherein Q is the copper phthalocyanine radical bearing the SO₂-groups in the 3, 3', 3'' and 3''' positions.

References Cited in the file of this patent
UNITED STATES PATENTS
2,951,837   Andrew et al. _____ Sept. 6, 1960
OTHER REFERENCES
CIBA (South Africa), 2630, 1957 (67 pages, pages 1-8, 47-48 and 55-56 relied on).

UNITED STATES PATENT OFFICE
CERTIFICATE OF CORRECTION

Patent No. 3,123,594                                   March 3, 1964

Eugen Johann Koller et al.

It is hereby certified that error appears in the above numbered patent requiring correction and that the said Letters Patent should read as corrected below.

Column 1, line 53, for "deystuff" read -- dyestuff --; column 5, lines 67 to 75, for that portion of the formula reading:

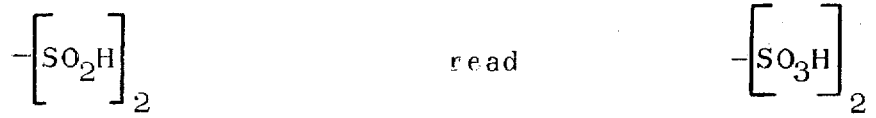

column 6, lines 33 to 38, for that portion of the formula reading:

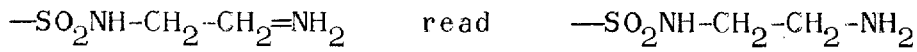

columns 7 and 8, in the table, item 8, under "11" for "CuFnC-3-" read -- CuPhC-3- --.

Signed and sealed this 10th day of November 1964.

(SEAL)
Attest:

ERNEST W. SWIDER                                   EDWARD J. BRENNER
Attesting Officer                                  Commissioner of Patents